Figure 1:
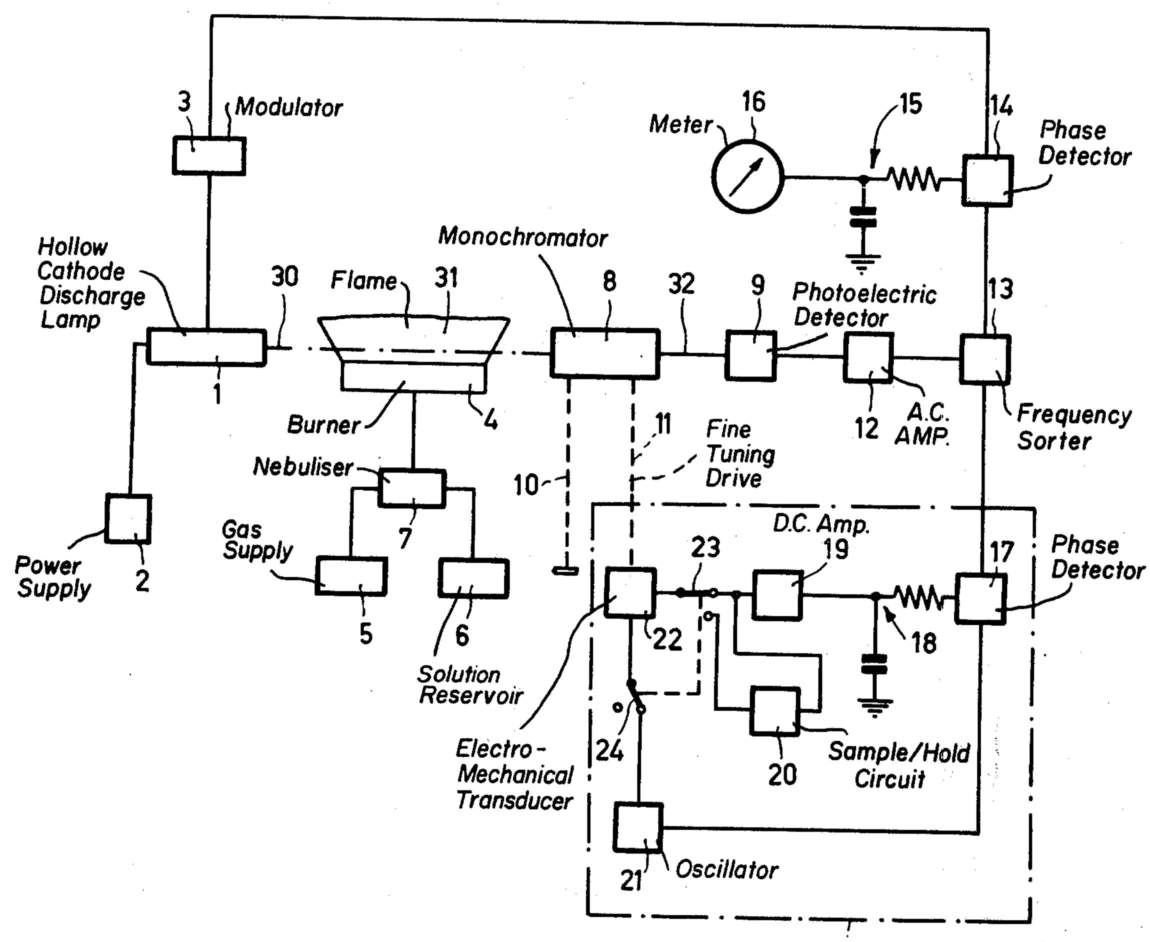

United States Patent [19]
Newstead

[11] 3,917,407
[45] Nov. 4, 1975

[54] SPECTROPHOTOMETER WITH AUTOMATICALLY FINE TUNED MONOCHROMATOR

[75] Inventor: Ronald Alfred Newstead, Cambridge, England

[73] Assignee: Pye Ltd., Cambridge, England

[22] Filed: Nov. 8, 1973

[21] Appl. No.: 414,110

[30] Foreign Application Priority Data
Nov. 30, 1972 United Kingdom.............. 55340/72

[52] U.S. Cl................................... 356/97; 356/100
[51] Int. Cl.²......................... G01J 3/18; G01J 3/42
[58] Field of Search......................... 356/80, 93–101

[56] References Cited
UNITED STATES PATENTS 2,837,959 6/1958 Saunderson et al. ................ 356/80
3,064,520 11/1962 Saunderson et al. ................ 356/80

*Primary Examiner*—Ronald L. Wibert
*Assistant Examiner*—F. L. Evans
*Attorney, Agent, or Firm*—Frank R. Trifari; Ronald L. Drumheller

[57] ABSTRACT

Apparatus for automatically fine tuning a monochromator wherein an electrical oscillator drives an electromechanical transducer which varies the monochromator wave length and a detector responsive to the radiation beam from the monochromator controls a D.C. amplifier which servo controls the bias to the transducer.

8 Claims, 7 Drawing Figures

SPECTROPHOTOMETER WITH AUTOMATICALLY FINE TUNED MONOCHROMATOR

This invention relates to spectrophotometers, and in particular to the tuning of monochromators used in such instruments.

One known type of spectrophotometer is an atomic absorption spectrophotometer, in which the constituents of an unknown chemical sample may be determined both qualitatively and quantitatively by introducing a solution of the unknown sample in the form of a mist into a suitable flame to cause the solution to atomise. Radiation having known spectral lines is then directed through the atom cloud with the result that certain spectral lines of the radiation characteristic of certain elements are absorbed by the atomic vapour. The degree to which the spectral lines are absorbed determines the concentration of the constituents in the unknown sample. Typically, beams of radiation having narrow spectral lines characteristic of a particular element are provided by electron discharge devices of the hollow cathode type.

A particular spectral line of the source of radiation is conventionally selected by means of a calibrated monochromator manually tuned. Fine manual tuning of the monochromator, once the selected line is positioned partly within the monochromator exit slit is achieved using an energy meter to register maximum intensity and it is usually necessary for reasons of thermal and mechanical instability of the instrument to repeat the fine tuning operation frequently even when no change of radiation source is made.

The need in conventional instruments of the above-described type for frequent manual retuning of the monochromator to ensure maximum instrumental sensitivity and repeatability makes the routine analysis of a series of samples for the same element by atomic absorption techniques a tedious operation and has also hitherto prevented the automation of such analysis. It is an object of the present invention therefore to provide an automatic fine tuning arrangement which will overcome these disadvantages.

According to the invention there is provided an atomic spectrophotometer including a monochromator, a detector responsive to the radiation beam from an exit slit of the monochromator to generate an electric output, and an arrangement capable of automatically fine tuning the monochromator wavelength when a selected spectral line has been positioned at least partly within said exit slit; in which said arrangement includes an electromechanical transducer adapted to adjust the monochromator wavelength, a d.c. amplifier adapted to bias the transducer, an electrical oscillator adapted to cyclically drive the transducer at a predetermined frequency so as to produce a signal component at said frequency in the output of the detector, and means responsive to said signal component to produce a change of level at the input of the d.c. amplifier; and in which the transducer, monochromator, detector, input level changing means and d.c. amplifier function in a closed-loop servo system which reduces the amplitude of the signal component at said frequency and adjusts the bias on the transducer to a value at which the selected spectral line is centred on the monochromator exit slit.

The invention is applicable both to the analysis of a series of samples for a single element and to the analysis of a single sample for a series of elements. Furthermore, although both the problem as set out above and the detailed description below relate to atomic absorption spectrophotometers, we believe that the invention can also be used with advantage in relation to atomic emission and atomic fluorescence spectrophotometers.

Figure 2:
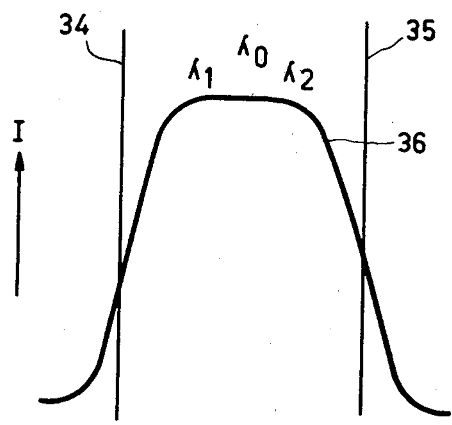
Figure 3:
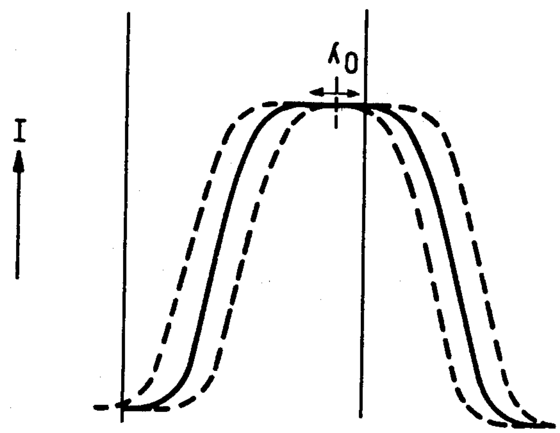
Figure 4:
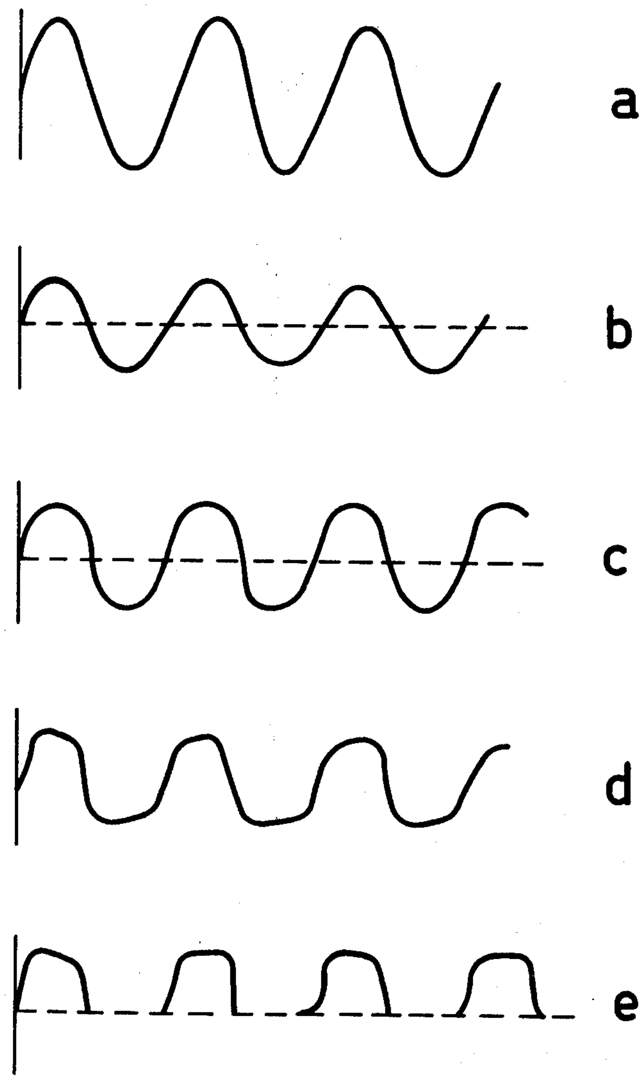
Figure 5:
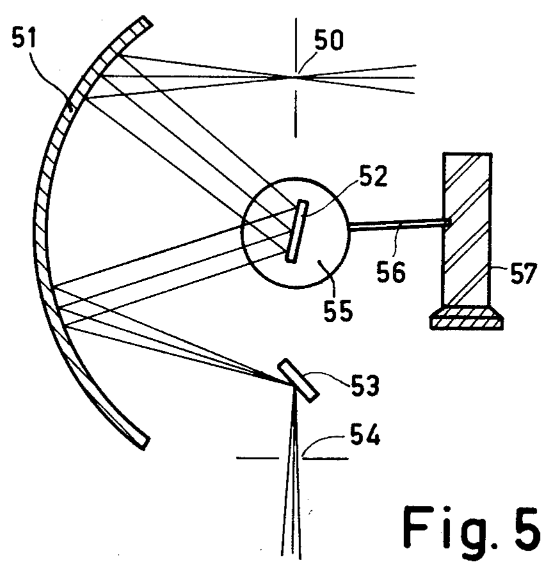
Figure 6:
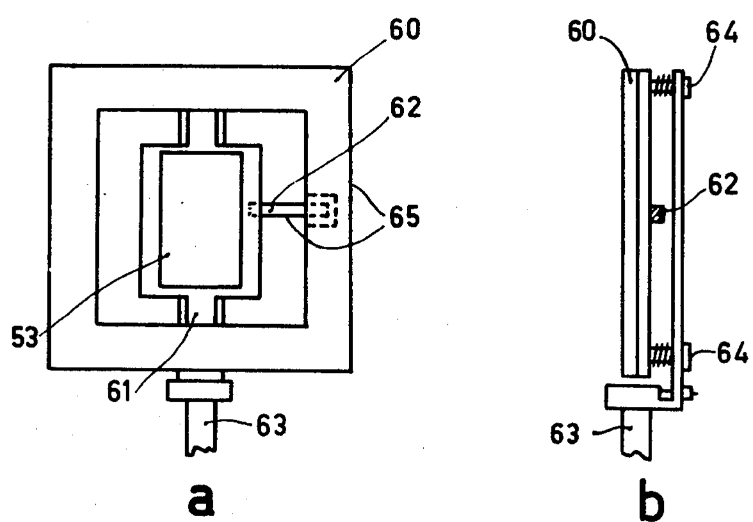
Figure 7:
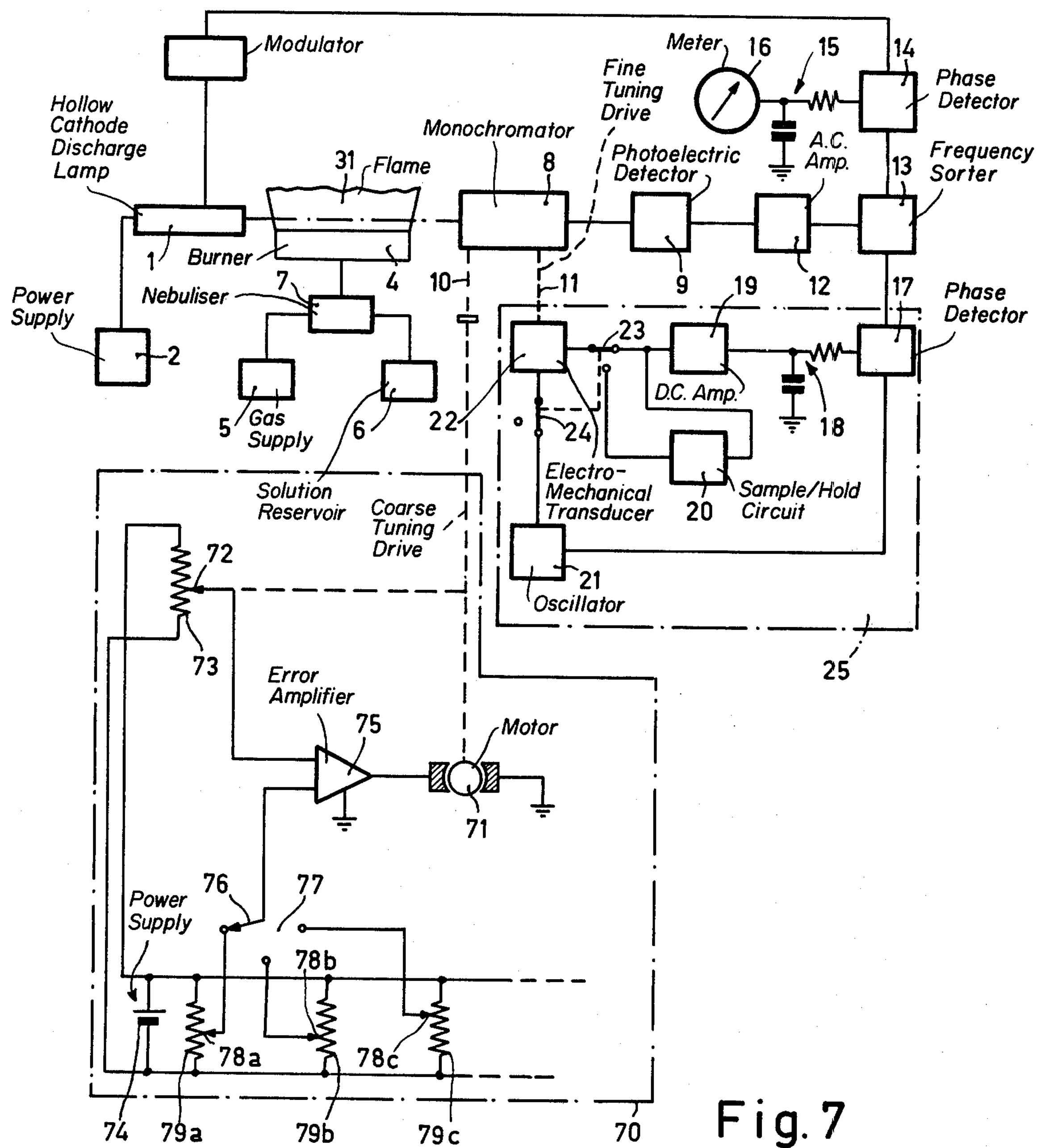

Embodiments of the invention will now be described, by way of example, with reference to the accompanying drawings, in which:

FIG. 1 is a schematic diagram of an atomic absorption spectrophotometer according to the invention, FIGS. 2, 3 and 4 are waveform diagrams illustrating the mode of operation of the spectrophotometer shown in FIG. 1, FIG. 5 shows a monochromator of a type suitable for use in the spectrophotometer shown in FIG. 1, FIGS. 6*a* and *b* show part of the monochromator of FIG. 5 in greater detail, and FIG. 7 shows a schematic diagram of another atomic absorption spectrophotometer according to the invention.

Referring now to FIG. 1, the instrument comprises a hollow cathode discharge lamp 1, a power supply 2 for the lamp 1, a modulator 3, a burner 4, a combustible gas supply 5, a sample solution reservoir 6, a nebuliser spray chamber 7, a monochromator 8 and a photoelectric detector 9. The monochromator 8 includes separate means for coarse and fine wavelength adjustment under the control of mechanical drives indicated as 10 and 11 respectively. The photoelectric detector 9 has associated with it an AC amplifier 12, a frequency sorter 13, a first circuit comprising a phase sensitive detector 14, an RC integrating network 15 and a meter 16, and a second circuit comprising a phase sensitive detector 17, an RC integrating network 18, a DC amplifier 19, a sample/hold circuit 20, an oscillator 21 and an electromechanical transducer 22. Linked switches 23 and 24 respectively connect the DC amplifier 19 and the oscillator 21 to the transducer 22, in the position shown, and in the other position, connect DC sample/hold circuit 20 between the DC amplifier 19 and the transducer 22 and disconnect the oscillator 21.

In operation a radiation beam 30, modulated at a frequency $f1$ by the modulator 3, passes through the flame 31, supported upon the burner 4 by combustible gas from the supply 5, to the entrance slit of the monochromator 8, manually adjusted by means of the drive 10 to select a preferred resonance line of the discharge spectrum of the lamp 1. A beam 32 of substantially monochromatic radiation from the monochromator 8, falls upon the photoelectric detector 9 generating an electrical output signal related in amplitude to the intensity of the beam 32. Amplified by the AC amplifier 12, the component of the output signal at the frequency $f1$, namely the lamp modulation frequency, is fed by the frequency sorter 13 to the phase sensitive detector 14, which is also fed with a reference signal at the frequency $f1$, from modulator 3. The DC output from the phase sensitive detector 14 is integrated by the RC network 15 and is indicated by the meter 16.

The automatic fine tuning system shown within broken lines in FIG. 1 and indicated generally as 25 comprises the electro-mechanical transducer 22 coupled to the fine tuning drive 11, the phase-sensitive detector 17, the DC amplifier 19, and the oscillator 21, together with the sample/hold circuit 20.

In an instrument of a kind hereinbefore proposed which is similar to that shown in FIG. 1 but has no automatic fine tuning system 25, the monochromator 8 is tuned manually to the wavelength of the preferred resonance line. The resonance line is then positioned symmetrically within the exit slit of the monochromator 8 by reference to the indication of the meter 16, so that the maximum amount of radiation energy falls upon the photoelectric detector 9 and the sensitivity of the instrument is therefore at a maximum. FIG. 2 shows a plot 36 of radiation intensity against the monochromator wavelength across the exit slit defined by the slit edges 34 and 35 when the monochromator wavelength and the wavelength $\lambda_0$ of the preferred resonance line correspond. In practice precise manual adjustment of the monochromator 8 is difficult and the wavelength limits $\lambda_1$ and $\lambda_2$ between which the monochromator 8 must be tuned are specified for the instrument. oscillator FIG. 3 shows the plot of radiation intensity within the monochromator exit slit for the preferred resonance line of wavelength $\lambda_0$ when the monochromator 8 is tuned to a wavelength less than $\lambda_0$. With the automatic fine tuning system 25 in operation, a cyclic drive signal at a frequency $f_2$ is applied to the transducer 22 and provides a cyclic variation of the monochromator wavelength. A resulting intensity variation at the frequency $f_2$ is produced in the beam 32 and a corresponding signal component at the frequency $f_2$ is present in the output signal from the photoelectric detector 9. This component is separated by the frequency sorter 13 and passed to the phase-sensitive detector 17, which is also fed with a reference signal at the frequency $f_2$ from the asocillator 21.

The loop comprising the transducer 22, the monochromator 8, the photoelectric detector 9, the phase-sensitive detector 17 and the DC amplifier 19, functions as a closed-loop servo system. The integrated DC signal from the detector 17 is applied to the DC amplifier 19 and passed to the transducer 22 and is of such a sense as to bias the transducer 22 and hence the fine tuning drive 11, to bring the monochromator wavelength towards $\lambda_0$, thereby reducing the amplitude of the signal component at the frequency $f_2$.

The closure error of the loop is dependent upon the overall loop gain. If the gain of the DC amplifier 19 is made sufficiently high the closure error can be reduced sufficiently to tune the monochromator 8 automatically to a wavelength between $\lambda_1$ and $\lambda_2$. The accuracy with which the monochromator 8 is tuned by the system depends inter alia upon the overall gain of the loop.

The waveforms shown in FIG. 4 illustrate the operation of the automatic fine tuning system 25. FIG. 4*a* shows the output signal of the oscillator 21 applied to the transducer 22 and FIG. 4*b* the resultant variation of the monochromator wavelength with the transducer 22 and the drive 11 so linked that a positive-going drive signal causes an increase in the monochromator wavelength.

An increase or a decrease in the monochromator wavelength respectively causes a corresponding increase or decrease in the radiation intensity incident on the detector 9 when the monochromator 8 is initially mis-tuned as shown in FIG. 3. The cyclic change of radiation intensity at the frequency $f_2$, shown in FIG. 4*c*, produces a signal component at the frequency $f_2$, shown in FIG. 4*d*, at the input of the phase-sensitive detector 17, in phase with the reference signal from the oscillator 21. The output from the detector 17, which is shown in FIG. 4*e*, is integrated by the RC network 18 and produces a change of level at the input of the DC amplifier 19 causing an alteration in the DC bias applied to the transducer 22 such as to increase the monochromator wavelength bringing the preferred resonance line of wavelength $\lambda_0$ toward a central position in the exit slit.

If the monochromator wavelength is initially greater than $\lambda_0$, an intensity variation is produced in the beam 32 in antiphase to the drive signal from the oscillator 21, giving rise to a shift in the DC bias applied to the transducer 22 such as to decrease the monochromator wavelength.

The operating sequence for a manually operated atomic absorption spectrophotometer including an automatic fine tuning facility such as is described above is as follows:

a. A lamp 1 is selected to produce a line spectrum of the chemical element for which the sample solution in reservoir 6 is to be analysed.

b. Monochromator 8 is manually tuned by calibrated coarse tuning control 10 to bring the selected resonance line at least partly within the exit slit of monochromator 8.

c. With the switches 23 and 24 in the position shown in FIG. 1, the automatic fine tuning system acts to minimise the error between the monochromator wavelength and $\lambda_0$.

d. Switches 23 and 24 are operated to substitute an equivalent DC bias from sample/hold circuit 20 in place of that produced by the closed loop system, i.e. to regenerate the output of the amplifier 19, and to remove the oscillator drive from transducer 22.

e. Meter 16 is set to indicate zero absorbance (100% Transmittance) with water introduced into flame 31 and f. A sample from reservoir 6 is introduced into flame 31 and the reading upon meter 16, indicative of the quantity of the chosen element present in sample 6, recorded.

With an automatic fine tuning system as described above an atomic absorption spectrophotometer may be used to analyse a series of samples in succession without the need to manually retune the monochromator 8 between each analysis, switches 23 and 24 being momentarily operated between successive samples to allow the fine tuning system to maintain the instrument at maximum sensitivity. If the samples for analysis are presented automatically into position, switches 23 and 24 could be linked with the sample delivery mechanism.

The monochromator 8 employed in the instruments described with reference to FIG. 1 is conveniently of the Ebert-Fastie type having the configuration shown in FIG. 5 and comprising an entry slit 50, a spherical mirror 51, a phane grating 52, a plane corner mirror 53 and an exit slit 54. Unmonochromated light falling upon slit 50 is dispersed by grating 52 which is moved about a central axis perpendicular to the plane of the paper by means of the control linkage, shown diagrammatically and comprising turntable 55, arm 56 and calibrated drum 57, rotation of which causes a rotation of plane grating 52 and change of monochromator wavelength. Plane corner mirror 53 is also rotatable about an axis perpendicular to the plane of the paper with a limited arc to provice a fine adjustment of monochromator wavelength.

One form of fine adjustment for monochromator 8 adopted for use in the automatic fine tuning system described above is shown in FIG. 6.

A rigid frame 60 has clamped to it a phosphor bronze strip 61 to which is affixed the plane corner mirror 53 of monochromator 8. A piezoelectric bender element 62 is clamped at one end to frame 60 and at the other freely contacts strip 61.

Frame 60 is mounted upon axially adjustable support 63 by means of sprung adjusting screws 64 which facilitate the setting of mirror within monochromator 8. Electrical connection is made to piezoelectric element 62 by leads 65 attached to the opposing silver-plated faces of the element. Application of an electrical potential across the opposite faces of element 62 causes a physical deflection in a direction dependent upon the polarity of the applied potential and of a magnitude related to the magnitude of the potential.

The piezoelectric bender element 62 serves as transducer 22 and is subject both to the alternating drive signal of frequency $f_2$ from oscillator 21 and the DC bias signal from DC amplifier 19 or sample/hold circuit 20. In a Ebert-Fastie monochromator of the type described with reference to FIG. 5 having a focal length of 25 cms., a grating ruling density of 1800 lines/mm, a slit width of 0.05 mm and a distance of 100 mm between mirror 53 and exit slit 54, the total angle through which the mirror 53 requires to move is 20 seconds of arc, achieved by using a drive voltage of 10 volts from oscillator 21.

Piezoelectric bender element 62 has the advantage of being a high impedance device, requiring little operating current. Other fine tuning elements may however be employed, e.g. magneto-strictive crystals. Mirror 53 may alternatively be mounted upon a galvanometer suspension, biasing and driving signals being applied to the galvanometer coil.

Alternatively if no corner mirror 53 is employed in the monochromator either exit slit 54 or plane grating 62 can be driven to provide the variation of monochromator wavelength required for operation of the fine tuning system. Another possibility would be to place a refracting plate, e.g. of quartz, between the entrance slit 50 and the mirror 51. This plate would be pivotally mounted and the mounting driven to provide the fine tuning operation.

FIG. 7 shows a fully automatically tuned atomic absorption spectrophotometer in which coarse tuning of the monochromator 8 is effected by means of an electro-mechanical servo-mechanism generally indicated at 70 and fine tuning by means of the automatic fine tuning system described above. Like parts of the instrument shown in FIGS. 1 and 7 bear like reference numerals.

Referring to FIG. 7 an atomic absorption spectrophotometer of the type shown in FIG. 1 additionally comprises a motor 71 linked to the coarse tuning drive 10 of monochromator 8 and to the slider 72 of potential divider 73 connected across a source 74 of reference potential. Slider 72 is connected to one input of error amplifier 75; the other input is connected to the moving contact 76 of switch 77 whose fixed contacts are connected to the sliders 78 *a/b/c* . . . . of a series of potential dividers 79 *a/b/c/* . . . . in parallel across the source 74 of reference potential. The output of error amplifier is connected to motor 71.

In operation the potential picked off slider 72 of a potential divider 73 bears a direct relationship to the wavelength to which monochromator 8 is set by motor 71. The sliders of 78 *a/b/c* . . . . potential dividers 79 *a/b/c* are set to pick-off potentials related to predetermined monochromator wavelength settings. Selection of one of the sliders 78 *a/b/c* by switch 76 feeds the pick-off potential to one input of error amplifier 75 producing an output signal driving motor 71 to tune monochromator 8 thereby reducing to a minimum the difference between the signal derived from the potential divider 79 and that related to monochromator wavelength derived from potential divider 73. Sliders 79 *a/b/c* are set to a series of positions which cause servo-motor 71 to drive monochromator 8 to a related series of wavelength settings to bring a series of predetermined spectral lines within the exit slit of monochromator 8. The automatic fine tuning system then adjusts monochromator 8 to an optimum position as described above. Ideally switch 77 is linked with a further switch controlling the operation of a multiple lamp turret to bring a series of sources characteristic of different elements into position. Each of the sliders 78 *a/b/c* will be set to select a strong spectral line from the respective spectrum enabling a sample solution in reservoir 6 to be analysed successively for each of a series of elements.

Control of switch 77, the linked lamp turret switch, and switches 23 and 24 can be under the control of automatic timing and cycling means so as to thereby provide a totally automatic instrument.

What I claim is:

1. An atomic spectrophotometer including a monochromator, a detector responsive to the radiation beam coming from an exit slit of the monochromator to generate an electric output, and an arrangement capable of automatically fine tuning the monochromator wavelength when a selected spectral line has been positioned at least partly within said exit slit, said arrangement including an electromechanical transducer for adjusting the monochromator wavelength, a d.c. amplifier for biasing the transducer, an electrical oscillator for cyclically driving the transducer at a predetermined frequency to produce a signal component at said frequency in the output of the detector, and means responsive to said signal component for changing the input level of the d.c. amplifier in the direction which tends to reduce the amplitude of the signal component at said frequency, thereby adjusting the bias on the transducer to a value at which the selected spectral line is centered on the monochromator exit slit.

2. A spectrophotometer as claimed in claim 1, in which the monochromator includes a dispersive element with means for rotating said element to position the selected spectral line at least partly within said exit slit, and in which deflecting means within the monochromator are adjustable by said electromechanical transducer to fine tune the monochromator.

3. A spectrophotometer as claimed in claim 2, in which said deflecting means is a mirror on a rotatable support, and in which said electromechanical transducer is a piezoelectric bender element having one end fixed and the other end freely contacting said rotatable support.

4. A spectrophotometer as claimed in any one of claim 1 in which said input level changing means includes a phase sensitive detector circuit to which is fed the signal component at said predetermined frequency and a reference signal from the oscillator, and an integrating circuit connected between the output of the detector circuit and the input of the d.c. amplifier.

5. A spectrophotometer as claimed in claim 4, in which the intensity of the radiation beam entering the monochromator is modulated at another predetermined frequency, in which frequency sorting means passes the signal component at said predetermined frequency to the phase sensitive detector circuit of said input level changing means and passes a signal at said other predetermined frequency to a respective other phase sensitive detector circuit whose output is fed via a respective integrating circuit to measure means.

6. A spectrophotometer as claimed in claim 1 in which a switching means is provided which operates between a first position in which both the oscillator and the d.c. amplifier are connected to the transducer and a second position in which the oscillator is disconnected from the transducer and regenerating means are connected between the d.c. amplifier and the transducer to maintain a bias on the transducer which keeps the selected spectral line centred on the monochromator slit.

7. A spectrophotometer as claimed in claim 6, in which a sample delivery mechanism is provided to automatically present a series of samples for analysis in relation to the same spectral line, and in which said mechanism is adapted to operate said switching means between said first and second positions to automatically retune the monochromator for each analysis.

8. A spectrophotometer as claimed in claim 6, in which a servo-mechanism is provided to position a selected spectral line at least partly within the exit slit of the monochromator, and in which said servo mechanism is connected by timing means to said switching means whereby the monochromator is automatically tuned for a selected spectral line.

* * * * *

UNITED STATES PATENT AND TRADEMARK OFFICE

CERTIFICATE OF CORRECTION

PATENT NO. : 3,917,407

DATED : November 4, 1975

INVENTOR(S) : RONALD ALFRED NEWSTEAD

It is certified that error appears in the above–identified patent and that said Letters Patent are hereby corrected as shown below:

Column 3, line 20, cancel "oscilla-"
line 21, cancel "tor"
line 36, "asocillator" should be --oscillator--

Claim 4, line 1, cancel "any one of"

Signed and Sealed this

Third Day of May 1977

[SEAL]

*Attest:*

RUTH C. MASON
*Attesting Officer*

C. MARSHALL DANN
*Commissioner of Patents and Trademarks*